United States Patent [19]

Hansson et al.

[11] Patent Number: 4,513,122

[45] Date of Patent: Apr. 23, 1985

[54] RETENTION AND DRAINAGE AID

[75] Inventors: Eric A. Hansson; Felek Jachimowicz, both of Columbia, Md.

[73] Assignee: W. R. Grace & Co., New York, N.Y.

[21] Appl. No.: 476,807

[22] Filed: Mar. 18, 1983

[51] Int. Cl.$^3$ .................................................. C08F 8/32
[52] U.S. Cl. ............................... 525/332.3; 525/333.1; 525/333.2; 525/379
[58] Field of Search ............... 525/332.3, 333.1, 333.2, 525/379

[56] References Cited

U.S. PATENT DOCUMENTS 4,233,417 11/1980 Van Eenam ...................... 525/379
4,312,965 1/1982 Jachimowicz et al. ............ 525/379

*Primary Examiner*—Joseph L. Schofer
*Assistant Examiner*—Bernard Lipman
*Attorney, Agent, or Firm*—Howard J. Troffkin

[57] ABSTRACT

The present invention is directed to cross-linked, cationic polymers having a mixture of secondary and/or tertiary alkylene amine groups and alkylene quaternary ammonium groups pendant from a substantially completely saturated hydrocarbon polymer chain and to the use of said polymers as retention and drainage aids in paper making processes.

22 Claims, No Drawings

RETENTION AND DRAINAGE AID

BACKGROUND OF THE INVENTION

In modern papermaking, an ever-increasing emphasis is being placed on more complete recovery of furnish materials, such as pigments, fibers and additives, as a part of the ultimate sheet. Some of the many benefits the papermaker realizes by increasing the retention, especially of the fine particulate matter associated with respect to these components, are:

(a) better economic utilization of the furnish materials. Obvious economic advantages are achieved by increasing the retention of the furnish materials on the wire of the paper-making machine to provide more paper product and less waste;

(b) improved quality of the resultant sheet product. The retention of supplied furnish material yields a more uniform grade of product and fewer rejects on the production end product;

(c) less down-time due to a cleaner system. The retention of most of the fiber, fines, fillers and additives on the web does not allow these materials to accumulate in the recirculating white water of the production system. In systems where the white water is at least partially recirculated, this provides less build-up or concentration of fines in the the head box. It also provides less solids in the effluent stream and thereby minimizes the need for extensive treatment of the stream before release;

(d) increased production. By providing a means to retain the solids on the web and provide an increased drainage rate, a paper making machine can be frequently increased in rate and thereby increase production; and (e) more versatile paper production. The ability to retain more solids on the web can often reduce two-sidedness of the paper product and provides a means of incorporating materials otherwise impossible to use.

A large variety of materials have been used as retention aids. The most widespread of these, and among the oldest in use, are the salts of aluminum, in particular aluminum sulfate, sodium aluminate and sodium phosphoaluminate. These materials, however, have the defects of being required to be used in large amounts and not be a highly efficient retention aid.

Various polymeric materials, from naturally occurring gums to synthetic resins have also been used as retention agents. These include natural and chemically modified starches. The starches are normally retained in the sheet product. Synthetic, water-soluble polyelectrolytes which are cationic or anionic have also been used. Anionic polyelectrolytes are generally of the polyacrylamide type which has been partially hydrolyzed to thereby contain from 5 to 30 mole percent carboxyl groups.

The cationic polymers found useful are ones which generally contain cationic nitrogen-containing groups which may be in the form of free amino groups or of quaternary ammonium salts. These polymers are generally found useful for paper making processes using alkaline conditions. Typical polymers used for this purpose include polyvinyl imidazolines, polyaminoalkyl acrylates, polyethyleneimines, polyamideamines, copolymer of acrylamide and methacryloyloxyethyl trimethyl ammonium salts and co- and terpolymers of dialkyl diallyl ammonium halides. These and similar polymers are discussed in *Structure/Performance Relationship of Cationic, Anionic and Amphoteric Retention Aids* by Joseph Watts, Jr. et al, TAPPI 25th Paper Conference, pg., 53–67 (1970) as well as in U.S. Pat. Nos 2,585,583; 3,544,532; 3,679,748; 3,772,076. These polymers are deficient because of their low charge density and/or low molecular weight.

It is desired to obtain a polymeric material which has a high charge density, has a molecular structure capable of providing a high degree of attraction between polymer and particulate materials commonly contained in paper furnish and has a molecular weight range capable of aiding in the retention of particulate material on the web.

SUMMARY OF THE INVENTION

The subject invention is directed to a new cross-linked cationic polymer having secondary and/or tertiary amino groups and alkylene (predominantly methylene) quaternary ammonium groups pendant from the hydrocarbon polymer chain. The cross-linked polymer unexpectedly provides excellent retention and drainage capabilities.

DETAILED DESCRIPTION

The polymeric material of the present invention has a unique structure of having a substantially saturated hydrocarbon polymer backbone chain, having pendant secondary and/or tertiary and quaternary alkylene amino groups; being sufficiently cross-linked through quaternary ammonium groups to form a high molecular weight, water soluble polymer. The resultant polymer has an extremely high charge density which provides very strong polymer-particle surface interaction. This plus the polymer mass configuration provides excellent retention characteristics for use in paper making and the like.

The useful product of the present invention can be formed by first aminomethylating an olefinic containing polymer under conditions to cause high amine incorporation. The resultant polymeric polyamine is then modified by chain extension and/or cross-linking and by quaternization to produce a resultant product having the desired charge density and molecular weight distribution.

The initial polymer is preferably formed by aminomethylation of a polymeric material having a multiplicity of olefinic groups (non-aromatic unsaturation) within the polymer structure. The olefinic containing polymers useful herein can be formed from monomers having multiple olefinic groups therein alone (homopolymers), or in combination with other monomers, by conventional cationic, anionic, free radical, coordination or supported metal catalytic processes, as are well known by the artisan. The term "olefinic containing polymer" or "olefinic prepolymer", as used herein, is meant to define homopolymers and copolymers which contain a multiplicity of olefinic bonds distributed throughout the polymer chain etiher as a part of the polymer backbone or as a part of the pendant group. The olefinic containing polymer should have a molecular weight of at least 500 and preferably from about 1000 to 1,000,000. It is most preferable to utilize an olefinic polymer of molecular weight of from 1,000 to 200,000.

The olefinic containing polymers useful herein can be homopolymers formed from $C_4$ to $C_{10}$ monomers having multiple olefinic groups therein, such as, for example, from butadiene; isoprene, pentene, cyclopentadiene; dimers of cyclopentadiene; 1,3-pentadiene; 1,4-pentadiene; 1,3-hexadiene; 1,4-hexadiene; 1,5-hexadiene; 2,4-hexadiene; 1,3,5-hexatriene and the like, as well as such monomers containing substituents thereon which are inert with respect to aminomethylation, such as $C_1$–$C_3$ alkyl, halo and carbonyl radicals. Further, the polymers useful herein may be copolymers formed from at least one monomer compound which is capable of forming polymeric segments containing olefin bonds therein, such as copolymers formed from more than one monomer capable of imparting olefinic groups to the polymer such as, for example, copolymers of poly(butadiene-isoprene), poly(butadiene-1,4-pentadiene) and the like as well as copolymers having one copolymerizable monomer not forming olefinic groups to the polymer segments, such as acrylamides, acrylonitrile, styrene, actylates, alkyl vinyl ethers, alkyl vinyl ketone and the like, and mixtures thereof, and $C_1$–$C_{20}$ hydrocarbyl derivates of such monomers, such as alpha-methyl styrene, methyl methacrylate and the like. Such materials are formed in conventional manners by free radical, cationic or anionic polymerization techniques, as are well known. A large variety of these polymers can be readily obtained commercially, such as polybutadiene, hydroxy terminated polybutadiene poly(butadiene-acrylonitrile), poly(butadiene-styrene), and the like. The olefinic containing polymers used to form the initial polymeric polyamine should contain at least about 10 percent by weight of olefinic group segments (C═C) therein to provide sufficient reactive sites for forming alkylene amine pendant groups.

The olefinic containing polymer is reacted with carbon monoxide, hydrogen and/or water (preferably hydrogen alone) and a primary or secondary amine in the presence of catalytic amount of a Group VIII (of the Periodic Chart) metal compound such as inorganic salts, carbonyls and the like or organometallic compounds such as carboxylic acid salts, chelates such as of norbornadiene and the like. The metal is preferably selected from the Group VIII metals of rhodium, ruthenium, iridium or mixtures thereof. The most preferred catalysts are compounds having rhodium alone or with ruthenium.

Aminomethylation of the polymer requires the utilization of CO and $H_2$. These gases can be in a molar ratio of from 1:10 to 10:1 with from 2:1 to 1:2 being normally preferred. Other inert gases such as argon, nitrogen and the like can be present and used to form a part of the total reaction pressure as described below.

The amine can be a primary or secondary amine represented by the formula

wherein R represents a hydrogen, $C_1$–$C_6$ alkyl, cycloalkyl or aryl group and R' represents a $C_1$–$C_6$ alkyl, cycloalkyl, or aryl group. Any of the groups may be substituted with a group which is nonreactive to aminomethylation such as ethers or alcohols. It must be recognized that the groups should be sufficiently small to provide little or no steric hinderence in the further reactions that the nitrogen atom subsequently undergoes as described hereinbelow. Therefore, it is preferred that each R' and R each independently represent a $C_1$–$C_3$ alkyl group.

The aminomethylation is carried out in the presence of a Group VIII metal compound. The metal is preferably rhodium or a mixture of rhodium with a second Group VIII metal especially with ruthenium or with iridium. The mixture can be of a ratio of from about 1000:1 to 1:1000 with 100:1 to 1:100 being preferred.

Hydrogen is the preferred hydrogen source in the aminomethylation of hydrocarbon polymers to achieve high degrees of alkylene amino pendant groups on the polymer chain. Small amounts of water may be present but it is preferred that the reaction be carried out under substantially anhydrous conditions.

The reaction is carried out at temperatures of from about 50° to 250° C. preferably from 100° to 200° C. and for times of from 0.5 to 10 hours, preferably from 2 to 6 hours, under a pressure of from 500 to 2,000 psi. The pressure is generally achieved by the presence of sufficient CO and $H_2$. Additional pressure is attained by the presence of inert gases.

The polymer must have a high degree, generally of greater than about 40 percent and preferably greater than about 60 percent, incorporation of alkylene (preferably $C_1$–$C_3$) amino pendant groups based on the original olefinic content of the polymer. High degrees can be achieved by combined use of a Group VIII metal compound, hydrogen and high pressure. Further, substantially all of the residual olefinic groups of the polymer are hydrogenated under the above conditions. The polymeric polyamine may contain small amounts of residual olefinic groups such as less than about 20 percent and preferably less than about 10 percent of that originally contained in the polymer. It is most preferred that the polymer be substantially completely saturated.

The polymeric polyamine which can be formed as described above has certain unique structural features which are believed, though not meant to be a limitation on the present invention, to provide a highly effective end product suitable as a retention aid. The amino group, being pendant from the polymer backbone chain and extended from the chain by a methylene or other short chain alkylene bridge, is sterically positioned to be more readily accessible to further modification of quaternization and as a site for reaction, as described below, to extend the polymer chain and thereby attain the desired high molecular weight material. Further, the substantial absence of unsaturation in the polymer provides a more flexible chain which thus more readily permits reaction. Both the extended pendancy of the amino group and the polymer backbone structure have unexpectedly found to ultimately provide a material which can more readily associate itself with the particles of the paper furnish to cause improved retention and improved drainage.

The polymeric polyamine is then modified to form a polymer product having a high charge density and molecular structure capable of providing a high degree of retention of particulate matter in a paper web. The polymeric polyamine is modified by cross-linking and/or chain extending and by quaternizing amino groups.

The desired final product should be of high molecular weight yet must be water soluble material. Thus cross-linking and/or chain extension should be done to a greater degree when using low molecular weight starting polymer and may not be needed at all when using very high molecular weight starting polymer.

When cross-linking is required, it can be accomplished by reacting the aminomethylated product with an agent which is at least difunctional with respect to the pendant amino groups. When the pendant amino groups are predominantly secondary amines (using a primary amine in the aminomethylation) one can use compounds which contain at least two groups which are reactive with respect to secondary amines. These groups are well known to those skilled in the art and include carboxylic acids, epoxides, halides, aldehydes and the like. For example, compounds having at least two carboxylic acids including oxalic, malonic, succinic, glutaric, adipic, azelaic, dodecanedioic acids and the like; halides include alpha, omega-dihaloalkanes, prefereably halo being chloro- such as 1,2 chloroethane, 1,5-dichloro-n-pentane, and the like; polyaldehydes including trioxane, glyoxal, malonaldehyde, glutaraldehyde, phthalaldehyde and the like; epoxides including epoxy capped polyethyleneoxide, 1,3-diepoxybutane and the like; as well as compounds having at least one of each of at least two of the above reactive groups as, for example, epihalohydrins such as epichlorohydrin, glycolic acid, hydracrylic acid, formylacetic acid and the like.

When the aminomethylated polymer is formed using secondary amines, the polymeric polyamine will contain a predominant amount of tertiary amine groups. Such products should be reacted with a polyfunctional agent capable of reacting with a tertiary amino group. Such agents are di and polyepoxides di and polyhaloalkanes and compounds, such as epihalohydrins, which have a mixture of epoxy and halo groups therein. Such compounds are illustrated by examples hereinabove.

The polymeric polyamine can be chain extended in lieu of or in addition to the cross-linking described above when the olefinic containing polymer has terminal groups of hydroxy or a blocked carbonyl. These groups are inert to aminomethylation but are reactive sites for chain extension by contacting the polymeric polyamine with compound which is difunctionally reactive with respect to the terminal groups. For example, when the terminal groups are hydroxy groups the chain extenders can be dicarboxylates, diisocyanates and the like. When the terminal groups are carboxyl, the chain extenders can be diisocyanates, dihydroxyl, diamines and the like.

The polyfunctional agent can be reacted with the polymeric polyamine in a liquid which is a solvent for both materials. The liquid can be the same as that used in the aminomethylation reaction. The chain extension may be carried out at temperatures of from about 30° to 120° C. and preferably from 40° to 80° C. for a period of time sufficient to cause substantially complete reaction of the agent and polymer such as from 0.5 to 6 hours preferably from 0.5 to 3 hours. The amount of time required for completion can be readily determined by standard analytical techniques, such as by following viscosity increase until it levels off or by spectrographic analysis for disappearance of presence of reactive group of the polyfunctional agent, as well as by other standard techniques. The particular mode of monitoring the progress of the reaction will depend upon the particular agents used as is well determined by the artisan.

The molar ratio of polyfunctional agent to polymer is extremely critical as the present product must have at least a majority of the resultant polymer product have a weight average molecular weight of greater than 100,000 and preferably greater than 1,000,000. It is also critical that the molecular weight and/or cross-linking network of the polymer be sufficiently low to provide a water soluble product. The exact molecular weight will depend on the degree of amino groups present, the molecular weight of the starting aminomethylated polymer and the degree of cross-linking which is necessary to form the highest molecular weight, yet water soluble product.

The polymeric polyamine must be modified to transform at least a part of the amino groups to ammonium groups. This can be done by cross-linking through the tertiary amino groups as described above or by transforming some of the amines to ammonium groups as described below or both. Such products are especially useful when applied to alkaline conditions. The ammonium groups will form in situ when used under acidic conditions.

The polymer product may be modified to form quaternary ammonium groups from a substantial portion of the pendant amino groups of the polymer product. This can be readily accomplished by reacting the polymer product with alkyl halides. The alkyl hailde is preferably a $C_1$-$C_3$ alkyl chloride although other halogens can be used. Although the reaction can be carried out in an organic medium it is prefereable to perform the reaction in the presence of water. The halide forms a counterion to the formed ammonium group.

For illustrative purposes, the polymer product of the present invention when formed from polybutadiene as the olefinic containing polymer can be represented by the general formula:

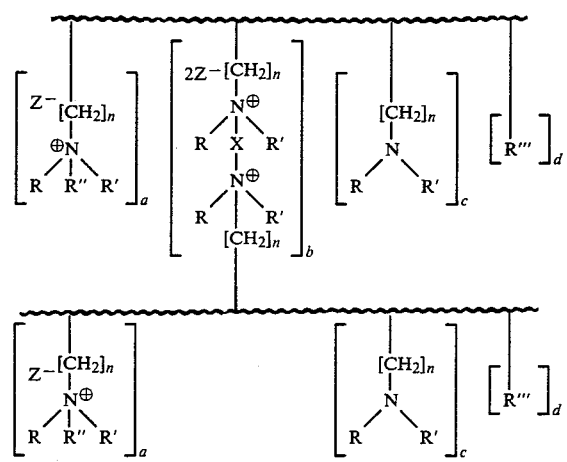

wherein ∼∼∼represents a substantially saturated hydrocarbon polymer chain, each R separately represents hydrogen or an unsubstituted or substituted $C_1$-$C_6$ alkyl, cycloalkyl or aryl; R' represents hydrogen or an R group; R" represents hydrogen or a $C_1$-$C_3$ alkyl; R''' represents hydrogen (for hydrogenated olefinic groups) or a comonomer pendant group (such as phenyl, nitrile, amide, ester, alkyl ether and the like) or both. X is residual organic group of a compound capable of covalently bonding with at least two nitrogen atoms and Z is a counterion such as a halide; n is an integer of from 1 to 3; a, b, c and d are each integers such that a and c is from about 1 to 90 percent, b is from about 1 to 30 percent and d is from about 1 to 60 percent of the total sum of a+b+c+d and the sum of the groups of a, b and c is present in at least 4 weight percent of the polymer product.

The resultant polymer has the features of being of high molecular weight, being water soluble, having a substantially saturated hydrocarbon polymer backbone structure, and having a high degree of pendant alkylene quaternary ammonium groups. These features impart to the product an extremely high charge density to provide strong polymer-particle surface interaction and a mass configuration which provides excellent retention characteristics.

The subject polymeric material can be incorporated into aqueous solutions or suspensions to be readily utilized as an additive in the paper making process. The polymer is normally present in from about 0.01 to 1 percent by weight of the composition although lower or higher concentrations may be appropriate depending on solubility of the polymer and/or application of composition.

Compositions containing the subject polymeric material have been found very effective retention and drainage aids. They may be utilized in conventional manners such as an additive to the head box of a conventional paper making machine.

The following examples are given for illustrative purposes only and are not meant to be a limitation on the subject invention as defined in the appended claims. All parts and percentages are by weight unless otherwise indicated.

EXAMPLE 1

A high vinyl polybutadiene (44.0 g., 0.815 mol C—C, molecular weight 1000 g/mol), monomethylamine (39.12 g, 1.30 mol), $Rh_6(CO)_{16}$, (297 mg, $1.6 \times 10^{-3}$ mol) and tetrahydrofuran (400 g) were charged into a 2 liter Magnadrive autoclave and pressurized to 1000 psi with $CO/H_2$ (1:1 ratio). The temperature was raised to 160° C. and maintained there for 2 hours.

The product was analyzed by acid titration to determine the amine incorporation to be 68.8%. NMR analysis showed the product to be substantially saturated. 65.0 g of the formed polyamine (73.5 mmol amine) was evaporated down to 35 g to remove unreacted methylamine. Tetrahydrofuran was added up to 51.6 g. The solution was charged into a 3-neck flask and water (41.3 g) was slowly added. To the formed emulsion, epichlorohydrin (4.21 g) was added. The mixture was heated for 2 hours at 30° C. Temperature was then raised to 55° C. and the tetrahydrofuran was distilled off. After two hours 96.5 g of product was obtained.

The product was tested (using a Britt's Dynamic Drainage test system) on bleached sulphite pulp (Canadian Std. Freeness 350 ml) with 5 percent clay at pH of 7.0. The solid content (consistency) was 0.35 percent and the fines content was 19 percent (including the clay). The polymer product was added to the aqueous slurry at the rate of 0.3 percent based on the weight of solids. The slurry was mixed and then a 100 ml sample was removed through a 200 U.S. Std. mesh screen. The samples were analyzed for amount solid carried through. The analysis showed 13.3 mg solid per 100 ml and 15.2 mg solid per 100 ml for two samples. For comparison, the experiment was repeated except that the retention aid was not used. The analysis of the material was 35.6 mg solid per 100 ml. This clearly shows that the subject product provided good retention and did not allow a high amount of particulate material to be removed through the screen.

EXAMPLE 2

25.1 g of polybutadiene (MW=1000, 80% vinyl content) in 500 ml of tetrahydrofuran, 25 g of dimethylamine, 118 mg of $Rh_6(CO)_{16}$ were sealed in a 2 l Parr reactor and pressurized with mixture of carbon monoxide and hydrogen (1:1) up to 1000 psig. The reaction took place at 150° for 6 hours. The amine incorporation of this reaction was 69.8%, and the solid content of the solution was 7.9%.

281 g of polyamine in tetrahydrofuran with a solid content of 20%, 140.5 g water, 139.7 g of 10% solution of $CH_3Cl$ (methyl chloride) in tetrahydrofuran were sealed in a 2 l Parr reactor, and reacted at 100° C. for 1 hour. Next, the aqueous and organic phases were separated. The aqueous layer was titrated and the degree of quaternization was found to be 82%. The solid content of the aqueous layer was 23.9%.

The quaternized product is then cross-linked with epihalohydrin in the manner and molar ratio as described in Example 1 above. The formed product is tested as described in Example 1 and shows that the product has excellent retention properties.

What is claimed is:

1. A polymeric product comprising a water soluble polymer having a substantially completely saturated polymeric backbone chain with a pendant alkylene amine groups represented by the formula:

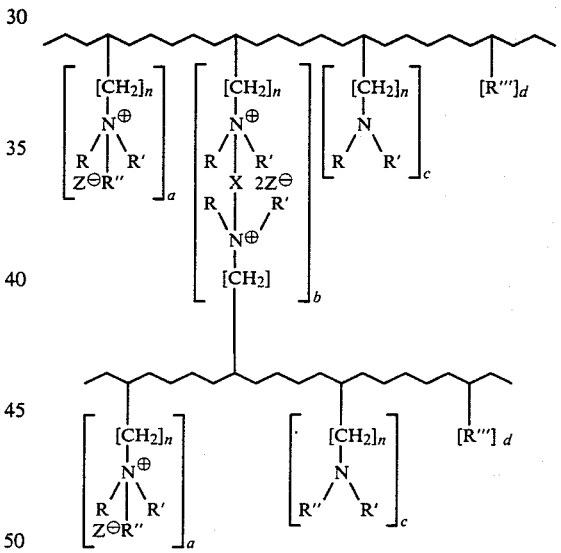

wherein ∼∼∼ represents a substantially saturated hydrocarbon polymer chain, each R separately represents an unsubstituted or substituted $C_1$-$C_6$ alkyl, cycloalkyl or aryl; R' represents hydrogen or an R group; R" represents hydrogen or a $C_1$-$C_3$ alkyl; R'" represents hydrogen or a comonomer pendant group or both, X is a residual organic group of a compound capable of covalently bonding with at least two nitrogen atoms of the polymer and Z is a counterion; n is an integer of from 1 to 3; a, b, c, d and e are each integers such that a, c and e is from about 1 to 90 percent, b is from about 1 to 30 percent, and d is from about 1 to 60 percent of the total sum of a+b+c+d+e; and the sum of the groups of a+c+e is at least 4 weight percent of the polymer product; said polymer is formed by reacting under substantially anhydrous conditions an olefinic bond containing polymer with an amine selected from a primary or secondary amine, hydrogen and carbon monoxide in the presence of a Group VIII metal containing compound to form a polymeric material having pendant alkylene amine groups and further reacting a portion of the alkylene amine groups with an agent which is at least difunctional with respect to the pendant secondary and tertiary amino groups, said difunctional agent being in molar ratio of from 0.3 to 1.1 with respect to said secondary amino groups and from 0.5 to 2.2 with respect to said tertiary amino groups.

2. The product of claim 1 wherein the polymeric material has pendant alkylene amine groups in at least 40 percent based on the olefin bond content of the olefinic bond containing polymer.

3. The product of claim 1 wherein at least a portion of said alkylene amine pendant groups are reacted with an alkyl halide to form quaternary ammonium groups therefrom.

4. The polymer of claim 1 wherein the olefinic containing polymer is a homopolymer or copolymer of polybutadiene or isoprene.

5. The polymer of claim 2 wherein the olefinic containing polymer is a homopolymer or copolymer of polybutadiene or isoprene.

6. The polymer of claim 3 wherein the olefinic containing polymer is a homopolymer or copolymer of polybutadiene or isoprene.

7. The polymer of claim 1 wherein the polymer product is water-soluble and has a weight average molecular weight of from about 100,000.

8. The product of claim 2 wherein the amine is a primary amine selected from unsubstituted or substituted $C_1$–$C_6$ alkyl, cycloalkyl or aryl amine.

9. The product of claim 3 wherein the amine is a primary amine selected from unsubstituted or substituted $C_1$–$C_6$ alkyl, cycloalkyl or aryl amine.

10. The product of claim 2 wherein the amine is a secondary amine represented by the formula:

wherein R and R' are each individually selected from a substituted or unsubstituted $C_1$–$C_6$ alkyl, cycloalkyl or aryl amine.

11. The product of claim 3 wherein the amine is a secondary amine represented by the formula:

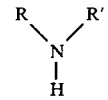

wherein R and R' are each individually selected from a substituted or unsubstituted $C_1$–$C_6$ alkyl, cycloalkyl or aryl amine.

12. A composition suitable for use as a retention and drainage aid in paper making comprising an aqueous medium having the product of claim 1 therein.

13. A composition suitable for use as a retention and drainage aid in paper making comprising an aqueous medium having the product of claim 2 therein.

14. A composition suitable for use as a retention and drainage aid in paper making comprising an aqueous medium having the product of claim 3 therein.

15. A composition suitable for use as a retention and drainage aid in paper making comprising an aqueous medium having the product of claim 4 therein.

16. A composition suitable for use as a retention and drainage aid in paper making comprising an aqueous medium having the product of claim 5 therein.

17. A composition suitable for use as a retention and drainage aid in paper making comprising an aqueous medium having the product of claim 6 therein.

18. A composition suitable for use as a retention and drainage aid in paper making comprising an aqueous medium having the product of claim 7 therein.

19. A composition suitable for use as a retention and drainage aid in paper making comprising an aqueous medium having the product of claim 8 therein.

20. A composition suitable for use as a retention and drainage aid in paper making comprising an aqueous medium having the product of claim 9 therein.

21. A composition suitable for use as a retention and drainage aid in paper making comprising an aqueous medium having the product of claim 10 therein.

22. A composition suitable for use as a retention and drainage aid in paper making comprising an aqueous medium having the product of claim 11 therein.

* * * * *